United States Patent [19]

Kuhlman et al.

[11] Patent Number: 5,060,751
[45] Date of Patent: Oct. 29, 1991

[54] PNEUMATIC WALL-LOCKING GEOPHONE SYSTEM

[75] Inventors: Harland L. Kuhlman; Calvin L. Cumerlato, both of Minneapolis; Daryl R. Tweeton, Apple Valley, all of Minn.

[73] Assignee: The United States of America as represented by the Secretary of the Interior, Washington, D.C.

[21] Appl. No.: 582,690

[22] Filed: Sep. 14, 1990

[51] Int. Cl.⁵ .............................................. G01V 1/40
[52] U.S. Cl. ................................... 181/102; 181/108; 181/401; 367/25; 367/86; 367/912; 175/50
[58] Field of Search ................... 367/86, 25, 911, 912; 181/102, 105, 106, 104, 401, 108; 175/40, 50

[56] References Cited

U.S. PATENT DOCUMENTS

| | | | |
|---|---|---|---|
| 4,744,438 | 5/1988 | Ruzie et al. | 367/911 |
| 4,844,197 | 7/1989 | Maissa | 367/911 |

*Primary Examiner*—Deborah L. Kyle
*Assistant Examiner*—J. Woodrow Eldred
*Attorney, Agent, or Firm*—E. Philip Koltos

[57] ABSTRACT

A seismic signal receiving system is provided for use in boreholes to receive seismic waves in carrying out geophysical investigations. The system includes three pairs of opposed plates, each of the pairs of plates including oppositely facing outer surfaces for engagement with opposite sides of a borehole. A seismic receiver is mounted on the inner surface of each of the plates for receiving seismic signals. A double-acting, fluid-operated actuator selectively causes relative movement of the plates of the pairs of plates away from each other to provide expansion thereof so as to enable the plates to engage the walls of a borehole and selectively causes relative movement of the plates of the pairs of plates toward each other to provide retraction thereof so as to enable the system to be removed from a borehole. The pairs of plates each comprise a relatively long plate and a relatively short plate. An expandable linkage interconnects the long plates at the distal ends thereof. The plates are mechanically biassed into the retracted state so that the plates return to this state in the event of a system failure.

20 Claims, 2 Drawing Sheets

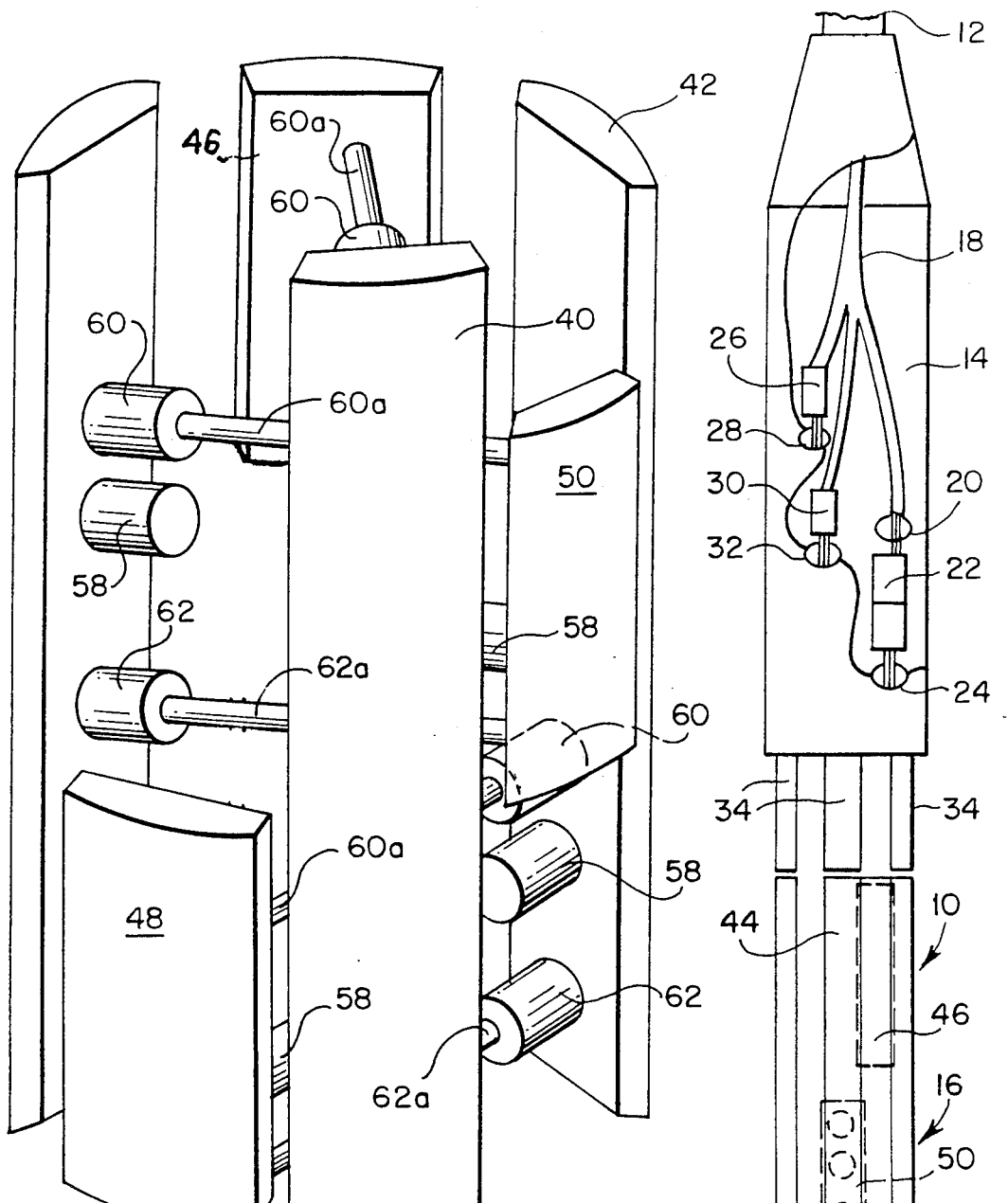
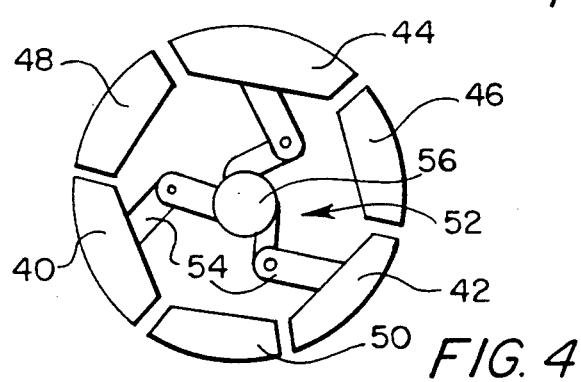
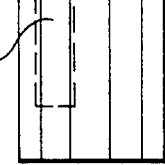
FIG. 2
FIG. 4
FIG. 1

PNEUMATIC WALL-LOCKING GEOPHONE SYSTEM

FIELD OF THE INVENTION

The present invention relates to geophones and like instruments or devices for detecting vibrations in mining and other applications and, more particularly, to an improved pneumatic wall-locking geophone system.

Field of the Invention

Geophone and other vibration detection instruments for detecting vibrations passing through rock, stone, ice and the like have many applications. One important potential application is in in situ mining in predicting and verifying the locations of leach solution flows. In particular, seismic crosshole surveying appears promising in locating zones of fracture and for detecting leach solution that has been injected above the water table. It will be appreciated that seismic velocities decrease in fractured materials and increase when rock that is originally dry is wetted by leach solution.

Although this approach or application appears to be promising in principle, it is necessary that the seismic receiver, i.e., the geophone system, meet several criteria in order for the approach to be successful in practice. For example, in order to provide an accurate measurement, the measured travel times must not depend on the orientation of the receiver with respect to the seismic source. In this regard, tests have shown that receivers of the type wherein a geophone is pressed against only one side of the borehole yield different travel times when the contact between the geophone and wall is facing toward the source than when this contact is facing away from the source. Further, to be useful to mining companies, the geophone system must be reliable, economical and easy to use.

Commercially available geophone systems are generally unsuitable for the application in question. For example, most commercially available units are designed for use in oil wells and thus are too heavy and expensive for such an application. However, smaller units also present problems as will appear from the discussion below.

Considering first the most commonly used seismic receivers, i.e., those used in oil wells, such receiver units, when used in a borehole, are pressed against the side or wall of the borehole, i.e., wall-locked, by an arm that articulates outwardly from the side of the tool. A typical unit of this type is the Institut Francais du Petrole Model SPH-300 Hydraulic Wall-Lock Geophone system. This unit includes a pair of hydraulically driven arms that swing outwardly from one side of the housing containing the geophones. In other models, the arm or arms are driven by an electric motor and associated gear system.

Smaller units include the Bison Model 1462 which employs a pneumatic packer, i.e., an inflatable rubber bladder, in effecting wall-locking. It has been found that such a unit is unreliable because of the relatively high rupture rate of the pneumatic packer. A smaller electrically driven unit is the Geospace Slimline Wall Clamp Geophone system which employs a single arm driven by an electric motor.

A further relatively small device of particular interest here is the seismic receiver system, Model 3399, made by Oyo, Inc. This receiver includes a locking or support arm and, among other disadvantages of this unit, the arm is not disposed directly across from the geophone. As a consequence, maximum pressure is not exerted at the geophone and the consequent non-alignment results in decreased coupling between the geophone and the borehole wall. Further, some resonance will be caused by the tube length of the geophone and although this resonance is less severe than the resonance that occurs with longer tubes, the resonance will contribute noise to the seismic signal. In addition, with the Oyo system there is contact between the borehole wall and the geophone on only one side of the borehole. Thus, if that side is facing towards the source, the measured travel time of the seismic signal will be a minimum while if that side is facing away from the source, the travel time will be a maximum and the amplitude of the signal will be smaller. A further disadvantage of the Oyo system and similar systems using an electric motor drive is that if there is a failure of the electric motor or of the electrical connections of such a geophone system, there is no way to provide retraction of the central arm if the failure occurs when the arm is extended and as a consequence the unit can get stuck in the borehole.

Patents of interest in this general field include U.S. Pat. Nos. 4,784,238 (Maissa); 4,641,724 (Chow et al); and 4,563,757 (Decorps et al). The Maissa patent discloses a large diameter borehole apparatus including a pair of diametrically opposed hydraulic pad displacement members, with a signal detector mounted behind one or more of the pads. The Chow et al patent discloses fracture detection apparatus including a four pad configuration with transducers spaced at 90° and a hydraulic drive system. The Decorps et al patent discloses apparatus for acquiring seismic signals in a borehole wherein a sonde is suspended in the bore hole by a cable and an anchoring pad is employed.

SUMMARY OF THE INVENTION

In accordance with the invention, a system is provided for use in boreholes for receiving seismic waves during geophysical investigations which "manipulates", i.e., controls the movement and end location of geophysical seismic receivers (geophones) and, in particular, holds these receivers against the borehole walls when seismic waves or signals are to be received and retracts them from the borehole walls when the system is to be moved.

According to a preferred embodiment of the invention, the geophone system comprises at least two opposed plates including oppositely facing outer surfaces for engagement with opposite sides of the walls of a borehole, a geophone or like seismic receiver mounted on each of said plates; and fluid operated means, connected between said plates, for causing relative movement of the plates toward each other to provide retraction thereof and for causing relative movement of the plates away from each other to provide expansion thereof to thereby permit the plates to be brought into engagement with the walls of the borehole and to be subsequently retracted to enable removal of the system when the measurement operation is completed.

In an advantageous embodiment, three pairs of plates are employed. In this embodiment, each pair of plates preferably comprises a relatively long plate and relatively short plate, and the fluid operated means comprises at least one double acting pneumatic actuator mounted on the long plates and connected by an extendable piston to the corresponding short plate. Advantageously, two pneumatic actuators are located on each of the long plates. In addition, an expandable linkage assembly is used to interconnect the long plates at the distal end thereof. Further, a plurality of pivotable "spider" legs provided at the proximal ends of the long plates connect these plates to a housing for the electrical and fluid connections to the seismic receivers (geophones).

According to an important feature of the invention, the fluid-operated means includes a biassing means (e.g., a return spring) for returning the plates to the retracted state thereof when the fluid operated means is not actuated As will be appreciated from the foregoing and the more detailed discussion which follows, the geophone system of the invention provides a number of important advantages over prior art systems. In this regard, the provision, in a preferred embodiment, of a plurality geophone pointing in different directions helps eliminate the directional effects of the orientation of the unit in the borehole on the signal received, and there is no need to attempt to orient the unit to obtain the strongest signal.

Further, the invention provides faster and more positive extension and retraction of the geophones. More specifically, the air actuated cylinders provide almost instantaneous movement, in contrast to electrical systems which take significantly longer to complete a corresponding movement.

In addition, the invention provides improved coupling between the geophones and the borehole walls, and thus provides improved sensitivity to signals. The improved sensitivity of the invention allows the use of less powerful seismic sources which, because of the reduced power thereof, are less damaging to the borehole walls. Further, the shorter length of the apparatus of the invention and the more direct borehole wall coupling reduces resonance effects and thereby improving the signal-to-noise ratio. In addition, the apparatus of the invention weighs less and as is stated, shorter than most if not all comparable units, and is consequently easier to move and to insert in the borehole.

Further, the apparatus of the invention is less likely to become stuck in a borehole because of component and system failure. For example, if the air driven system fails with the geophones in the extended position, the geophones will be retracted by the biassing means (e.g., return springs) of the cylinders of the pneumatic actuators. This contrasts with electrically driven systems wherein, as discussed above, if the system fails with the geophones extended, the control arm remains extended.

A further advantage is that the apparatus of the invention has fewer moving parts in the borehole and is thus less prone to failure. Further, the apparatus is less prone to having retraction thereof blocked or otherwise prevented by borehole debris such as small rocks dislodged from the borehole wall. The apparatus also requires less force to lock it in place and hence is less likely to damage the borehole wall.

Other features and advantages of the invention will be set forth in, or apparent from, the following detailed description of preferred embodiments of the invention.

BRIEF DESCRIPTION OF THE DRAWINGS

FIG. 1 is a vertical side elevational view of a geophone system, including an input system and an expandable geophone assembly, in accordance with a preferred embodiment of the invention;

FIG. 2 is a simplified perspective view, to an enlarged scale, of the expandable geophone assembly of FIG. 1, showing the assembly in the expanded state thereof;

FIG. 4 is an end view of the distal end of the apparatus of FIG. 1; and

DESCRIPTION OF THE PREFERRED EMBODIMENTS

Figures 3, 5:
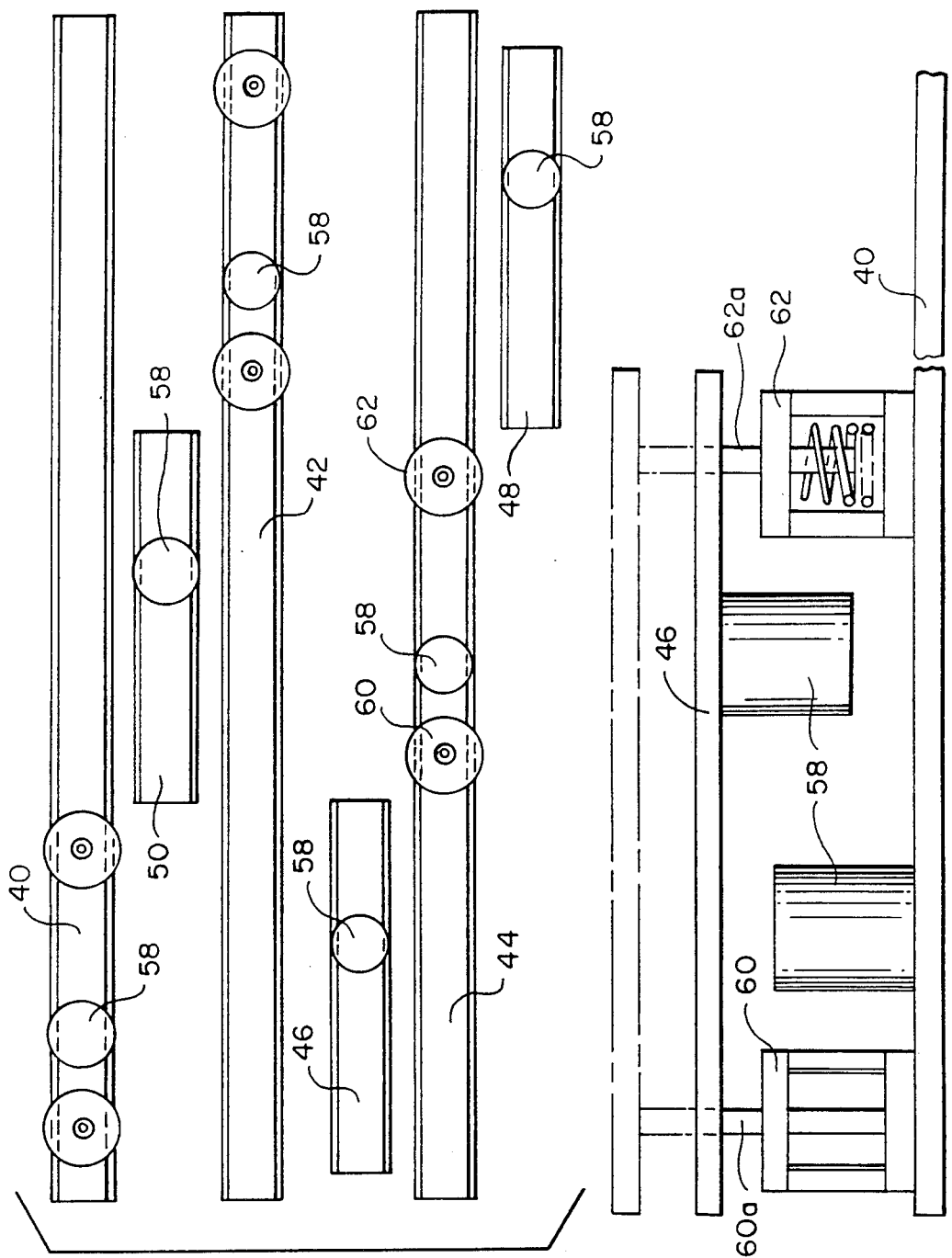
FIG. 3 is a plan view of the individual plates of the geophone assembly of FIGS. 1 and 2, in a disassembled state.
FIG. 5 is a simplified side elevational view of two of the plates of the geophone assembly of FIGS. 1 to 4.

Referring to FIG. 1, the overall geophone system, which is generally denoted 10, is shown. The basic elements of the system comprise an umbilical cable 12, a service cylinder 14 and a geophone assembly 16.

As is indicated schematically in FIG. 1, within the service cylinder 14 the umbilical cable 12 is partially unwound into the component parts thereof including a strength member cable 18, a six pair electrical cable conductor 20 which is connected through an electrical connector 22 to six pairs of conductors 24 connected to the geophones described below, a one-cable air line-manifold 26 connected into six air lines 28 for locking the geophone assembly 16 to the borehole wall, and a further one-cable air line-manifold 30 connected into six air lines 32 for unlocking the geophone assembly 16 to thereby permit the removal of assembly 16 from the borehole wall. It will be appreciated that other and different connections can be provided and that, in general, any system that provides the necessary electrical and pneumatic connections to the geophone assembly 16 can be employed.

As was mentioned above and is discussed in more detail below, the geophone assembly 16 can be expanded and contracted and pivotable "spider" legs or links 34 are connected between the distal end of the service cylinder 14 and the long plates or segments of the geophone assembly to accommodate this expansion and contraction.

Referring to FIGS. 2 to 4 and particularly to FIGS. 2 and 3, the geophone assembly 16 includes three long plates or segments 40, 42 and 44 of the same length, and three short plates or segments 46, 48 and 50, which, as shown in FIG. 2, are disposed opposite and connected to plates 40, 42 and 46, respectively. As illustrated in FIG. 2 (and is also indicated in FIG. 3), the short plates or segments 46, 48 and 50 are spaced apart longitudinally along the lengths of the long plates 40, 42 and 46, with plate 46 being located near the top or proximal end of geophone assembly 16, plate 50 at the middle and plate 48 near the bottom or distal end. As is shown in FIG. 4, all of the plates or segments 40, 42, 44, 46, 48 and 50 fit together to form a cylinder and include curved outer surfaces or walls so that when the plates segments are fully retracted they together form a unit having a cylindrical outer surface, as illustrated. Although this is not shown in FIGS. 2 and 3 in the interest of simplicity, as is illustrated in FIG. 4 (and indicated in FIG. 1) the distal ends of the long plates 40, 42 and 44 are connected together by a linkage mechanism 52, including a plurality of pivoting arms 54 connected to a central hub 56, which permits radial expansion and contraction of the plates between the positions shown in FIGS. 2 and 4.

As is perhaps best seen in FIG. 3, each of the plates or segments has a geophone, indicated schematically at 58, mounted thereon. The geophones 58 are conventional, and the nature and construction of geophones used forms no part of the invention, and thus geophones 58 will not be described further except to state that any suitable geophone or like receiver unit can be used.

As mentioned above, expansion and retraction of the plates forming geophone assembly 16 is, effected so as to move the geophones 58 into contact with the walls of a borehole (through the corresponding plates) so that the geophones 58 can receive seismic waves,p and to also permit the geophone assembly 16 to be removed and, e.g., moved to another location, when a test operation is completed. This expansion and contraction is controlled by spaced pairs of double acting pneumatic actuators 60 and 62 mounted at spaced locations, on opposite sides of a corresponding geophone 58, on each of the long plates 40, 42 and 44 and connected by respective piston rods 60a and 62a to the associated short plates 46, 48 and 50 (see also FIG. 5).

The actuators 60 and 62 are best seen in FIG. 5 which shows the actuators for plates 40 and 46, as being representative. Actuators 60 and 62 are conventional and, in accordance with an important feature thereof in their present application, include a return spring, indicated schematically at 62b for actuator 62, which biases the piston rod (62a) of the associated actuator (62) into the retracted state thereof indicated in solid lines in FIG. 5. When an appropriate pneumatic control signal is received by actuators 60 and 62 the corresponding pistons 60a and 62a will be extended thereby causing relative movement of plate 46 away from plate 40 as indicated in dashed lines in FIG. 5. It will be appreciated that the generation of the pneumatic control signals for controlling extension and retraction of pistons 60a and 62a is controlled by an operator outside of the borehole and are transmitted through umbilical cable 12 and service cylinder 14 through the air lines referred to above (not shown in FIGS. 2 to 5) to the individual actuators. As is conventional, the actuators 60 and 62 are designed such that extension of the corresponding piston rods 60a and 62a is terminated when an obstacle is encountered so that when the plates contact and engage the walls of the borehole, the operation of the actuators ceases.

Although the present invention has been described relative to specific exemplary embodiments thereof, it will be understood by those skilled in the art that variations and modifications can be effected in these exemplary embodiments without departing from the scope and spirit of the invention.

We claim:

1. A seismic signal receiving system for use in boreholes to receive seismic waves in carrying out geophysical investigations, said system comprising:
    at least two opposed elongate plates including oppositely facing outer surfaces for engagement with opposite sides of a borehole;
    a seismic receiver means mounted on the inner surfaces of each of said plates to receiving seismic signals; and
    fluid-operated means connected between said plates for selectively causing relative movement of said plates away from each other to provide expansion thereof so as to enable the plates to engage the walls of a borehole and for selectively causing relative movement of said plates toward each other to provide retraction thereof so as to enable the system to be removed from a borehole, said fluid-operated means comprising an actuator mounted on one of said plates and including an extensible actuator member controlled by said actuator connected to the opposed plate, and the seismic receiver means mounted on one of the plates being offset from the seismic receiver means mounted on the opposed plate so as to permit the receiver means on the respective plates to closely approach the inner surface of the plate opposed thereto when the plates are retracted and such that the spacing of the plates when the plates are retracted is determined by the greater of the respective heights of the receiver means above the inner surfaces of their associated plates and the height of the actuator above the inner surface of the plate on which the actuator is mounted.

2. A system as claimed in claim 1 wherein said system comprises at least two pairs of said opposed plates and wherein the fluid-operated means of each pair of opposed plates is operationally independent of the fluid-operated means of each other pair of opposed plates so as to enable all plates to engage the walls of a non-circular borehole.

3. A system as claimed in claim 1 wherein said system comprises three pairs of said opposed plates and wherein the fluid-operated means of each pair of opposed plates is operationally independent of the fluid-operated means to each other pair of opposed plates so as to enable all plates to engage the walls of a non-circular borehole.

4. A system as claimed in claim 3 wherein said pairs of plates each comprise a relatively long plate and a relatively short plate, and said fluid-operated means comprising at least one pneumatic actuator mounted on each of said long plates of said pairs of plates and including a piston rod in engagement with the corresponding short plate.

5. A system as claimed in claim 4 wherein two pneumatic actuators are located on each of said long plates.

6. A system as claimed in claim 4 further comprising an expandable linkage means interconnecting said long plates at the distal ends thereof.

7. A system as claimed in claim 4 further comprising electrical and fluid connections for transmitting electrical signals from and conveying air to and from said seismic receiver means, a housing for housing said electrical and fluid connections, and pivot means for connecting the distal end of said housing to the proximal ends of said long plates so as to permit radial movement of said long plates.

8. A system as claimed in claim 4 wherein said pneumatic actuators each include biassing means for biassing the piston rod thereof into a retracted state.

9. A system as claimed in claim 1 wherein said fluid-operated means comprises at least one double-acting pneumatic actuator.

10. A system as claimed in claim 9 wherein said pneumatic actuator includes an extendable piston and means for returning said piston to a retracted state when said actuator is not actuated.

11. A system as claimed in claim 1 wherein said fluid operated means includes means for automatically providing retraction of the plates to a retracted state when said fluid-operated means is not actuated.

12. A seismic signal receiving system for use in boreholes to receive seismic waves in carrying out geophysical investigations, said system comprising:

three pairs of opposed plates, each of said pairs of plates including oppositely facing outer surfaces for engagement with opposite sides of a borehole;

a seismic receiver means mounted on the inner surface each of said plates for receiving seismic signals; and fluid-operated means connected between said pairs of plates for selectively causing relative movement of the plates of said pairs of plates away from each other to provide expansion thereof so as to enable the plates to engage the walls of a borehole and for selectively causing relative movement of the plates of said pairs of plates toward each other to provide retraction thereof so as to enable the system to be removed from a borehole, said fluid-operated means comprising an actuator mounted on one of said plates and including an extensible actuator member controlled by said actuator connected to the opposed plate, and the seismic receiver means mounted on one of the plates being offset from the seismic receiver means mounted on the opposed plate so as to permit the receiver means on the respective plates to closely approach the inner surface of the plate opposed thereto when the plates are retracted and such that the spacing of the plates when the plates are retracted is determined by the greater of the respective heights of the receiver means above the inner surfaces of their associated plates and the height of the actuator above the inner surface of the plate on which the actuator is mounted.

13. A system as claimed in claim 12 wherein said pairs of plates each comprise a relatively long plate and a relatively short plate, and said fluid-operated means comprising at least one pneumatic actuator mounted on each of said long plates of said pairs of plates and including a piston rod in engagement with the corresponding short plate.

14. A system as claimed in claim 13 wherein two pneumatic actuators are located on each of said long plates.

15. A system as claimed in claim 13 further comprising an expandable linkage means interconnecting said long plates at the distal ends thereof.

16. A system as claimed in claim 3 further comprising electrical and fluid connections for transmitting electrical signals and conveying air to and from said seismic receiver means, a housing for housing said electrical and fluid connections, and pivot means for connecting the distal end of said housing to the proximal ends of said long plates so as to permit radial movement of said long plates.

17. A system as claimed in claim 13 wherein said pneumatic actuators each include biassing means for biassing the piston rod thereof into a retracted state.

18. A seismic signal receiving system for use in boreholes to receive seismic waves in carrying out geophysical investigations, said system comprising:

three pairs of opposed plates, each of said pairs of plates including oppositely facing outer surfaces for engagement with opposite sides of a borehole;

a seismic receiver means mounted on the inner surface each of said plates for receiving seismic signals; and fluid-operated means connected between said pairs of plates for selectively causing relative movement of the plates of said pairs of plates away from each other to provide expansion thereof so as to enable the plates to engage the walls of a borehole and for selectively causing relative movement of the plates of said pairs of plates toward each other to provide retraction thereof so as to enable the system to be removed from a borehole, said pairs of plates each comprising a relatively long plate and a relatively short plate, and said fluid-operated means comprising at least one pneumatic actuator mounted on each of said long plates of said pairs of plates and including a piston rod in engagement with the corresponding short plate.

19. A system as claimed in claim 18 wherein two pneumatic actuators are located on each of said long plates.

20. A system as claimed in claim 18 further comprising an expandable linkage means interconnecting said long plates at the distal ends thereof.

* * * * *